(12) United States Patent
Sato et al.

(10) Patent No.: US 10,404,255 B1
(45) Date of Patent: Sep. 3, 2019

(54) DEVICE FOR AUTOMATIC CONFIGURATION OF SEMICONDUCTOR INTEGRATED CIRCUIT

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Hironori Sato, Kawasaki Kanagawa (JP); Hiroaki Muraoka, Kawasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 16/120,041

(22) Filed: Aug. 31, 2018

(30) Foreign Application Priority Data

Feb. 27, 2018 (JP) ................... 2018-033347

(51) Int. Cl.
 *H01L 27/02* (2006.01)
 *H03K 19/00* (2006.01)

(52) U.S. Cl.
 CPC ..... *H03K 19/0016* (2013.01); *H01L 27/0207* (2013.01)

(58) Field of Classification Search
 CPC .......................... H03K 19/0016; H01L 27/0207
 USPC ............................................................ 326/93
 See application file for complete search history.

(56) References Cited

U.S. PATENT DOCUMENTS

| 7,138,829 | B1* | 11/2006 | Dalvi ............... G01R 31/3016 326/41 |
| 7,616,043 | B2 | 11/2009 | Takano |
| 2008/0143383 | A1* | 6/2008 | Wong ................... G06F 9/3869 326/46 |
| 2013/0305078 | A1* | 11/2013 | Lee ........................... G06F 1/08 713/500 |
| 2014/0125381 | A1* | 5/2014 | Schreiber ........... G06F 17/5045 326/93 |

FOREIGN PATENT DOCUMENTS

| JP | 2010-004352 A | 1/2010 |
| JP | 2011-100346 A | 5/2011 |
| JP | 2011-107769 A | 6/2011 |
| JP | 5368941 B2 | 12/2013 |

* cited by examiner

*Primary Examiner* — Daniel D Chang
(74) *Attorney, Agent, or Firm* — Kim & Stewart LLP (57) ABSTRACT

A device for automatic configuration of a semiconductor integrated circuit includes a memory that stores circuit data representing a structure of a logic circuit including a first clock gating circuit, and a processor. The processor is configured to retrieve the circuit data from the memory, determine first and second logical elements from each of which an enable signal is output to the first clock gating circuit, calculate a delay time of each of the first and second logical elements, separate the first and second logical elements on the basis of the calculated delay time, and add a second clock gating circuit for the first logical element after separating the first and second logical elements.

20 Claims, 6 Drawing Sheets

DEVICE FOR AUTOMATIC CONFIGURATION OF SEMICONDUCTOR INTEGRATED CIRCUIT

This application is based upon and claims the benefit of priority from Japanese Patent Application No. 2018-033347, filed Feb. 27, 2018, the entire contents of which are incorporated herein by reference.

FIELD

Embodiments described herein relate generally to a device for automatic configuration of a semiconductor integrated circuit.

BACKGROUND

In a field of designing a semiconductor integrated circuit such as a large scale integrated circuit (LSI), it is known to use a clock gating circuit to reduce consumption of electric power. The clock gating circuit controls supply of clock signals in accordance with enable signals. For example, the clock gating circuit stops the supply of the clock signals to a logic circuit such as a flip-flop when the logic circuit is not operating.

To design a semiconductor integrated circuit, a software tool, such as an electronic design automation (EDA) tool and a logic synthesizing tool, is widely used. In a typical situation, the tool loads existing circuit data representing a structure of a logic circuit including enable logics, and automatically inserts a clock gating circuit based on timing of the enable signals. As a result, the power consumption in the logic circuit may be reduced, but the clock gating circuit may be arranged downstream of a clock buffer, which adversely affects the performance of the logic circuit.

DETAILED DESCRIPTION

In designing a semiconductor integrated circuit, to effectively reduce consumption of electric power in the semiconductor integrated circuit, a clock gating circuit is desirably set and inserted in the upstream of a clock buffer to more effectively gate a clock buffer in accordance with an enable logic.

In view of this, embodiments provide a design device for a semiconductor integrated circuit, by which a clock gating circuit is appropriately set to effectively gate a clock buffer, in designing a semiconductor integrated circuit.

In general, according to one embodiment, a device for automatic configuration of a semiconductor integrated circuit includes a memory that stores circuit data representing a structure of a logic circuit including a first clock gating circuit, and a processor. The processor is configured to retrieve the circuit data from the memory, determine first and second logical elements from each of which an enable signal is output to the first clock gating circuit, calculate a delay time of each of the first and second logical elements, separate the first and second logical elements on the basis of the calculated delay time, and add a second clock gating circuit for the first logical element after separating the first and second logical elements.

Hereinafter, embodiments of the present disclosure will be described with reference to the drawings.

[Configuration of Design Device]

Figure 1:
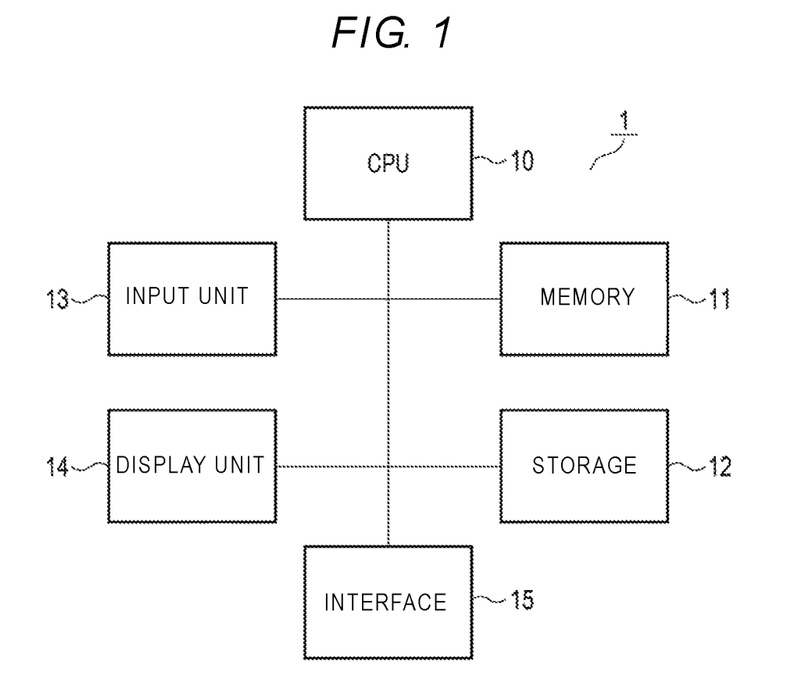
FIG. 1 is a block diagram for explaining a configuration of a design device for a semiconductor integrated circuit according to an embodiment.

FIG. 1 is a block diagram for explaining a configuration of a design device for a semiconductor integrated circuit according to an embodiment. FIG. 1 illustrates a design device 1 that is implemented by a computer system. The design device 1 includes a processor (here, central processing unit; CPU) 10, a memory 11, a storage 12, an input unit 13, a display unit 14, and an interface 15.

The CPU 10 reads a program from the memory 11 and executes a setting process of a clock gating circuit according to an embodiment in designing a semiconductor integrated circuit. The setting process will be described later. The memory 11 includes a random access memory (RAM), a flash memory, and other units to hold the program to be executed by the CPU 10 and various kinds of data.

The storage 12 is an external storage unit and stores software for automatically designing a semiconductor integrated circuit. Examples of this software may include an electronic design automation (EDA) tool and a logic synthesizing tool. In an embodiment, the program to be executed by the CPU 10 is contained in a logic synthesizing tool, and the program is loaded from the storage 12 to the memory 11.

The input unit 13 allows an operator to input logic circuit data and a command for operating the design device. The display unit 14 displays logic circuit data and a design result on a display in accordance with the control of the CPU 10. The interface 15 transmits or receives software and data to or from another device via a communication system such as a local area network (LAN).

[Operation of Design Device]

Figure 2:
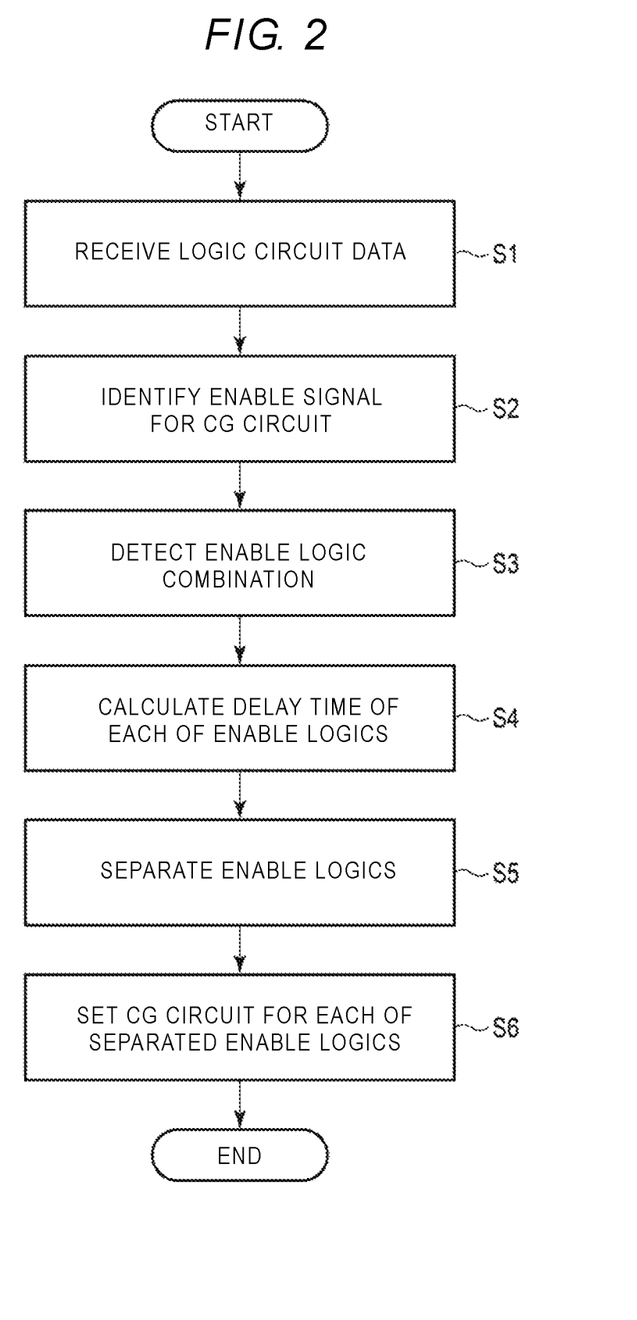
FIG. 2 is a flowchart for explaining a process of a design device according to an embodiment.

FIG. 2 is a flowchart for explaining a process of the design device 1. This embodiment relates to a setting and inserting process of a clock gating circuit (CG circuit) for reducing consumption of electric power, in automatically designing a semiconductor integrated circuit, such as an LSI.

Figure 3:
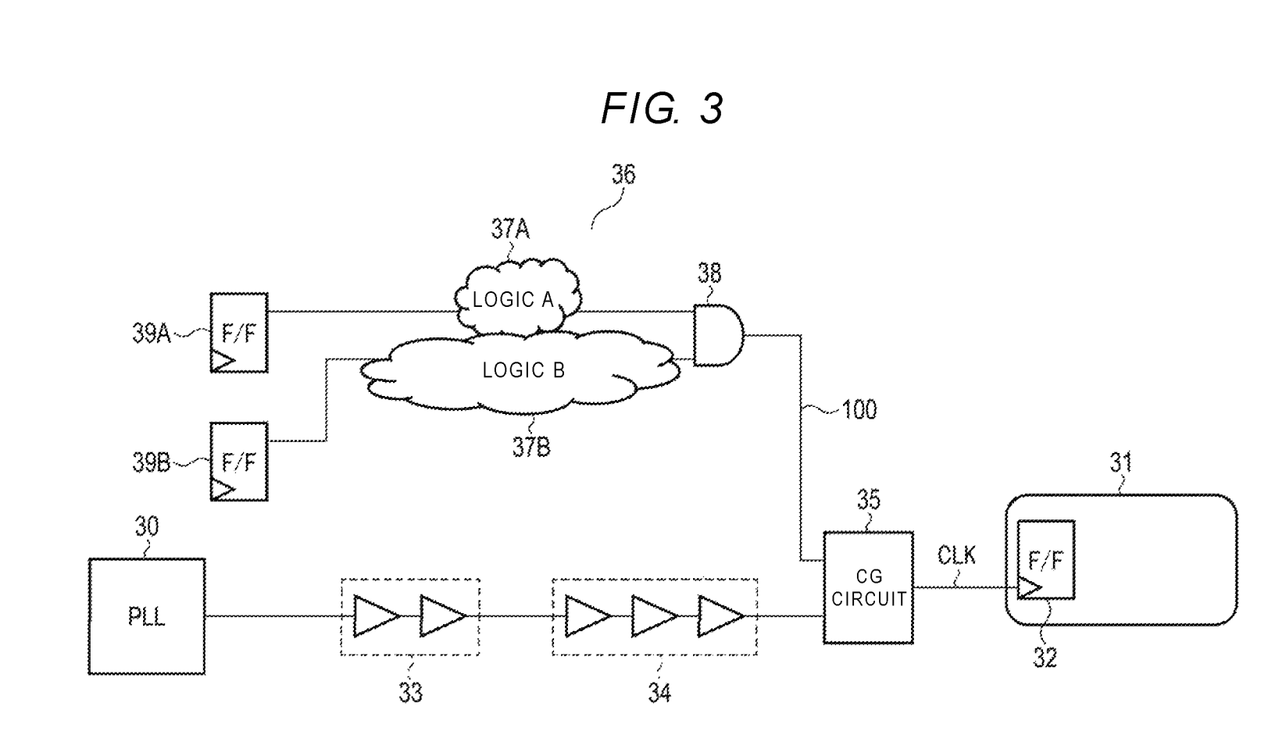
FIG. 3 is a depiction of logic circuit data generated according to a comparative example.

As illustrated in FIG. 2, upon receiving logic circuit data of a design target to which a CG circuit is inserted (S1), the CPU 10 stores the logic circuit data in the memory 11 or the storage 12, and then retrieve the data to execute a setting process of a CG circuit. FIG. 3 illustrates an example of logic circuit data of a design target.

As illustrated in FIG. 3, the logic circuit data shows a logic circuit having, for example, a clock generating circuit 30 in the highest order hierarchy at a leading end and a logic circuit block 31 in the lowest order hierarchy at a trailing end. The clock generating circuit 30 contains a phase-locked loop (PLL) and generates a clock signal (CLK). The logic circuit block 31 contains a flip-flop (F/F) 32 that is operated by the clock signal (CLK).

The clock signal (CLK) generated by the clock generating circuit 30 is transmitted to the logic circuit block 31 by multiple clock buffers 33 and 34. The clock buffers 33 and 34 distribute the clock signal, adjust a clock skew, and have other functions. The supply of the clock signal (CLK) output from the clock buffer 34 to the F/F 32 contained in the logic circuit block 31 is controlled by a CG circuit 35.

The CG circuit 35 performs gating in accordance with enable timing on the basis of an enable signal 100 generated by an enable logic combination 36 and thus controls the supply of the clock signal (CLK) to the F/F 32. In a typical case, the CG circuit 35 may include an AND gate and a latch circuit and may therefore also be called an "integrated clock gating (ICG) circuit".

The enable logic combination 36 contains, for example, enable logic circuits 37A and 37B and an AND gate 38. The enable logic circuits 37A and 37B respectively constitute enable logics A and B. Herein, the number of the enable logics is two. The enable logic circuits 37A and 37B receive outputs from flip-flops (F/F) 39A and 39B, respectively. The flip-flops 39A and 39B differ from each other. The output of each of the enable logic circuits 37A and 37B is input to the same AND gate 38.

To return to FIG. 2, upon receiving the logic circuit data as illustrated in FIG. 3 (S1), the CPU 10 analyzes the logic circuit data and identify an enable signal 100 in the CG circuit 35 (S2). Further, the CPU 10 detects each of the enable logic circuits 37A and 37B contained in the enable logic combination 36 for the CG circuit 35, on the basis of the identified enable signal 100 (S3).

Thereafter, the CPU 10 calculates a delay time of each of the detected enable logic circuits 37A and 37B (S4). The CPU 10 discriminates between the enable logic circuit 37A and the enable logic circuit 37B on the basis of the calculated delay times. For example, the enable logic circuit 37A has a small delay time relative to the enable logic circuit 37B.

Figure 4:
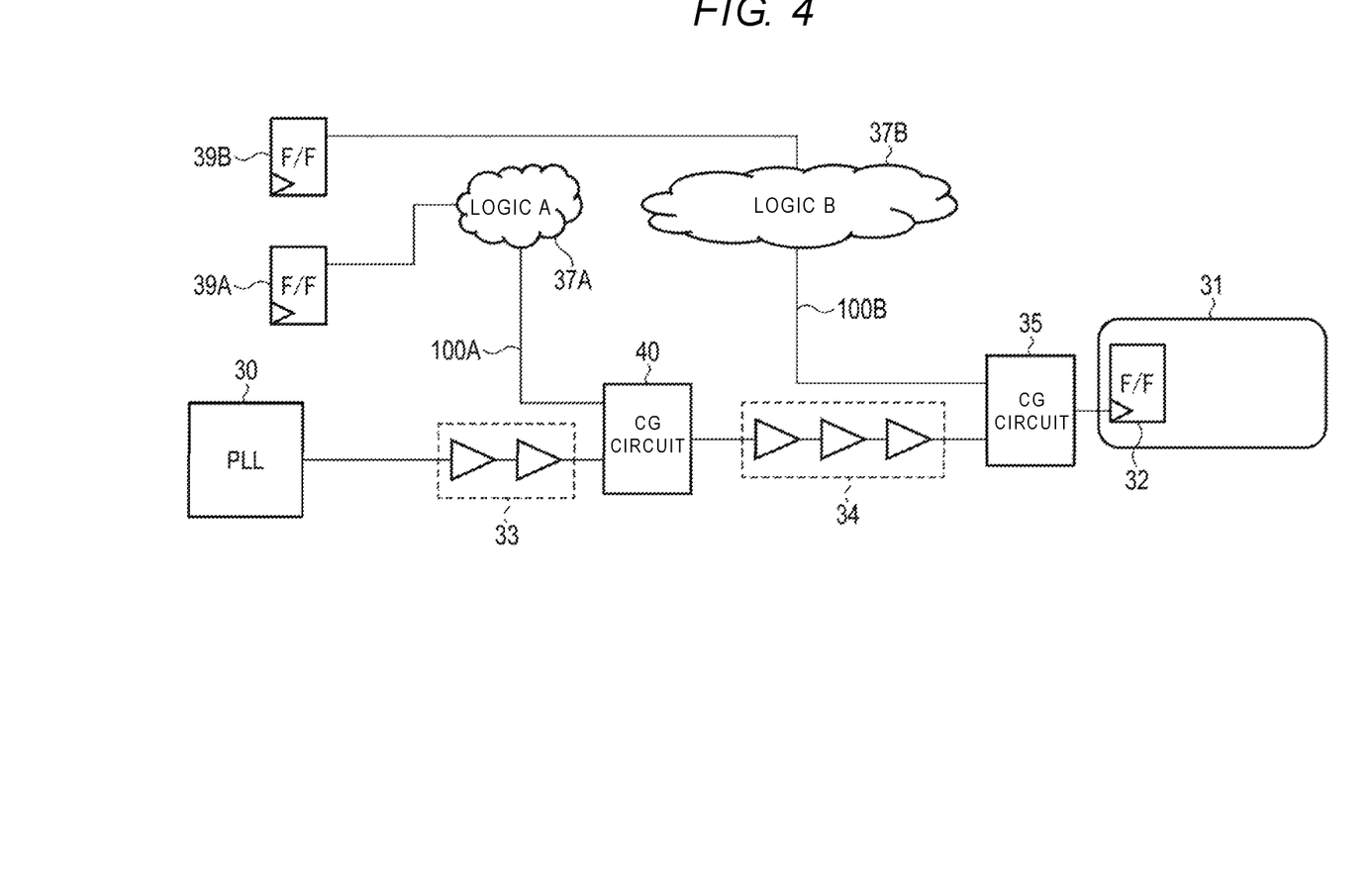
FIG. 4 is a depiction of logic circuit data generated according to an embodiment.

FIG. 4 illustrates an example of a result of designing the logic circuit data in FIG. 3 by executing the setting process of the CG circuit. As illustrated in FIG. 4, the CPU 10 separates the enable logic combination 36 into the enable logic circuit 37A having a small delay time and the enable logic circuit 37B having a large delay time (S5).

The CPU 10 executes the setting process of the CG circuit for the separated enable logic circuits 37A and 37B (S6). Specifically, as illustrated in FIG. 4, the CPU 10 adds a new CG circuit 40 in addition to the existing CG circuit 35. In an embodiment, the CG circuit 35 is arranged in the vicinity of the logic circuit block 31 at the trailing end. The CG circuit 40 is inserted at the input side in the upstream of the clock buffer 34. Herein, the CG circuit 40 is set in a higher order hierarchy. On the other hand, the CG circuit 35 is set in a lower order hierarchy at the output side in the downstream of the clock buffer 34.

The CG circuit 35 at the trailing end side controls the supply of the clock signal (CLK) from the clock buffer 34 in accordance with enable timing on the basis of an enable signal 100B from the enable logic circuit 37B having the large delay time. That is, the CG circuit 35 supplies the clock signal (CLK) to the F/F 32 if the enable logic is "1" and stops the supply of the clock signal (CLK) if the enable logic is "0".

Thus, when the logic circuit block 31 at the trailing end is not operated, the supply of the clock signal (CLK) is stopped, and therefore, consumption of electric power at the logic circuit block 31 containing the F/F 32 is prevented.

On the other hand, the CG circuit 40 that is inserted in the upstream of the clock buffer 34 controls the supply of the clock signal (CLK) from the clock buffer 33 in accordance with enable timing on the basis of an enable signal 100A from the enable logic circuit 37A having the small delay time. That is, the CG circuit 40 supplies the clock signal (CLK) to the clock buffer 34 if the enable logic is "1" and stops the supply of the clock signal (CLK) if the enable logic is "0".

Thus, when the enable logic of the enable logic circuit 37A is "0", the supply of the clock signal (CLK) is stopped by gating to the clock buffer 34 before the supply of the clock signal (CLK) is stopped by the CG circuit 35 at the trailing end side. As a result, consumption of electric power at the clock buffer 34 is prevented.

As described above, according to an embodiment, the enable logic combination is separated into an enable logic at which the delay time is smaller and an enable logic at which the delay time is larger to set and insert CG circuits that respectively receive inputs of enable signals from the corresponding enable logics, in the logic circuit of the design target.

That is, as illustrated in FIG. 4, the CG circuit 35 is set in the vicinity of the logic circuit block 31 in the lowest order hierarchy in the logic circuit of the design target, and the CG circuit 40 is also set in the upstream of the clock buffer 34. The CG circuit 40 gates the clock buffer 34 in accordance with the enable timing of the enable logic at which the delay time is small, that is, in accordance with the enable signal 100A from the enable logic circuit 37A. Thus, the supply of the clock signal (CLK) to the clock buffer 34 is stopped when the logic of the enable signal 100A is "0". Accordingly, the consumption of electric power at the clock buffer 34 is prevented in addition to the prevention of the consumption of electric power at the F/F 32 at the trailing end, whereby the total consumption of electric power is effectively reduced.

In other words, according to an embodiment, setting and inserting the CG circuit corresponding to each of the separated enable logics, as described above, increases the number of the clock buffers to be gated in the logic circuit of the design target. This results in increase in the number of the clock buffers for each of which the supply of the clock signal (CLK) can be stopped, thereby enabling effective reduction of the consumption of electric power.

[Modification]

Figure 5:
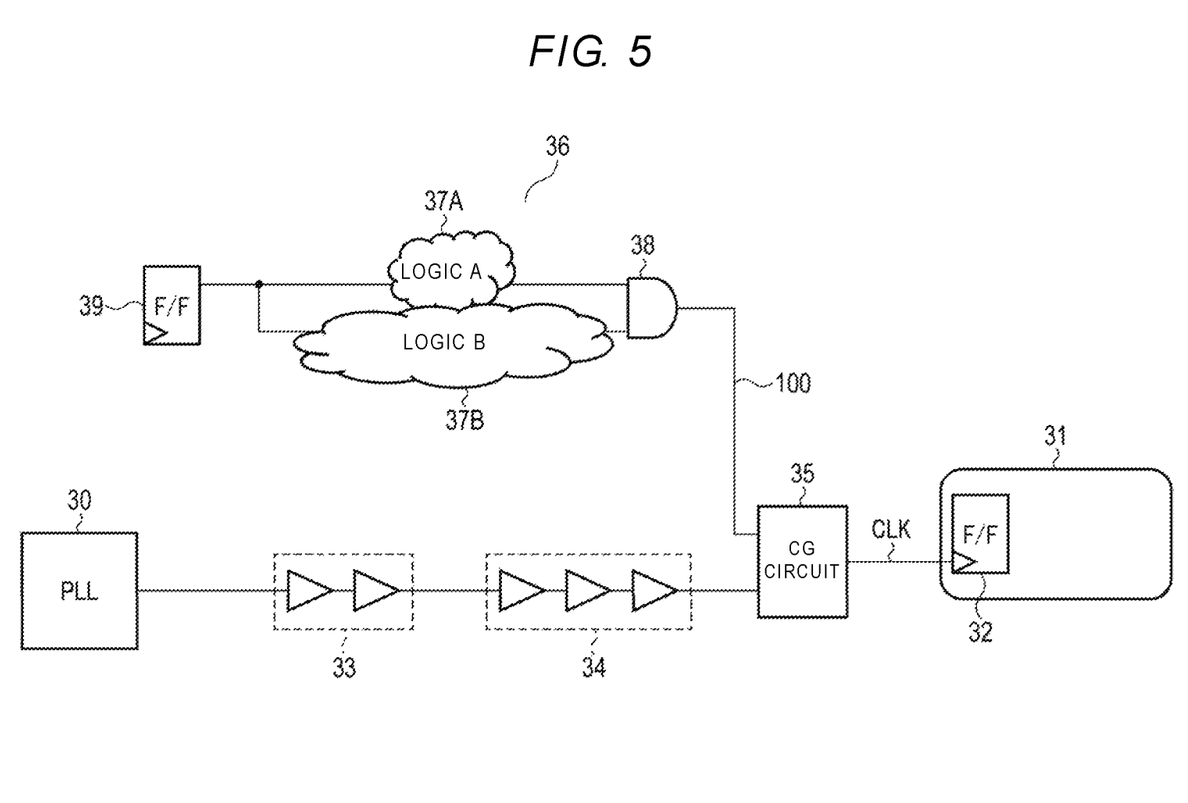
FIG. 5 is a depiction of logic circuit data generated according to another comparative example.
Figure 6:
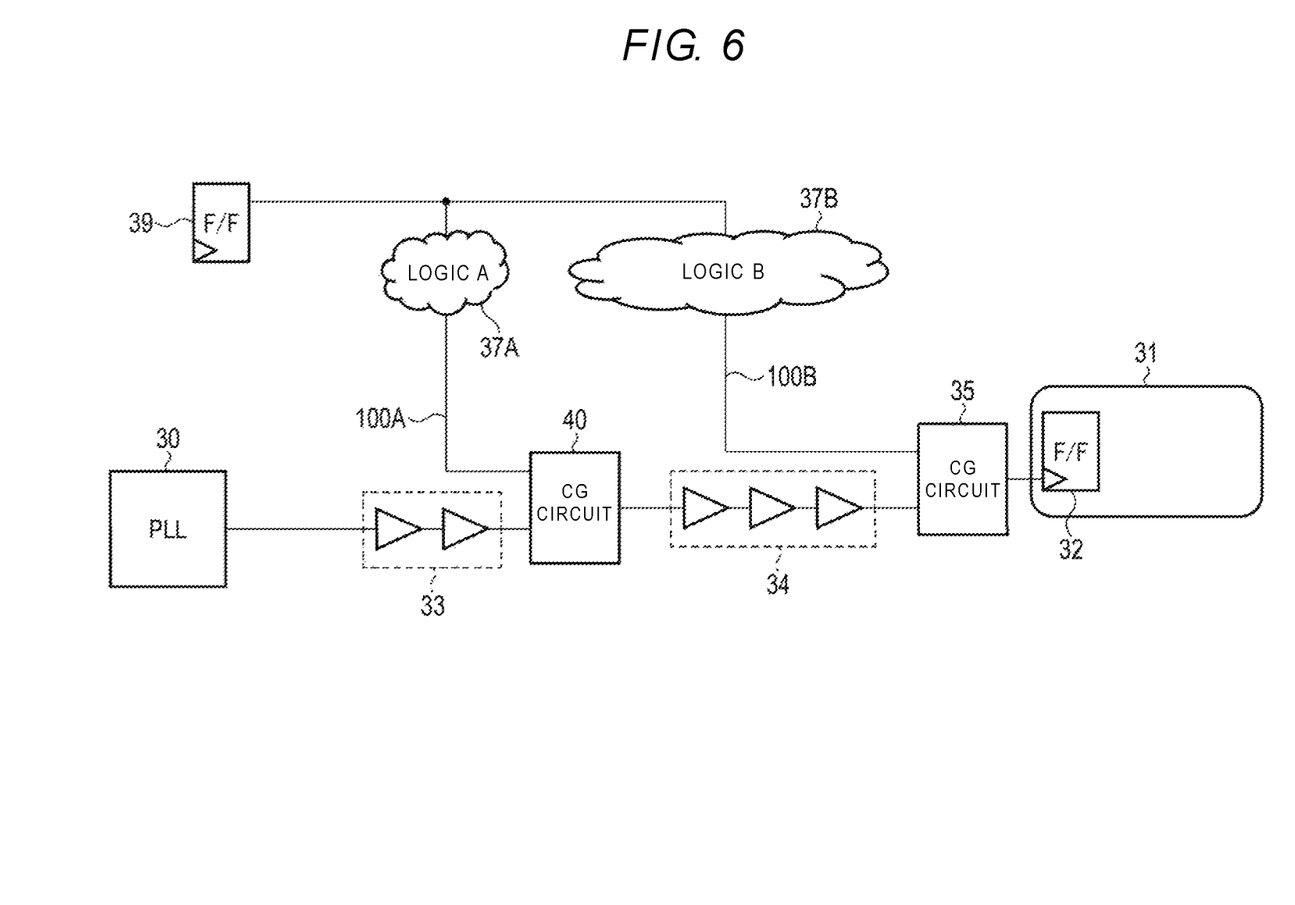
FIG. 6 is a depiction of logic circuit data generated according to an embodiment.

FIGS. 5 and 6 are diagrams for explaining a modification of this embodiment. FIG. 5 illustrates an example of logic circuit data of a design target of this modification. FIG. illustrates an example of a design result of this modification.

It is noted that, in this modification, the configuration of the design device for a semiconductor integrated circuit is similar to that in the case of the embodiments illustrated in FIG. 1, and therefore, descriptions thereof by referring to the drawings are omitted. In addition, the operation and the effects of the design device are similar to those in the embodiments illustrated in FIG. 2, and therefore, descriptions thereof by referring to the drawings are omitted.

As illustrated in FIG. 5, the CG circuit 35 performs gating in accordance with the enable timing on the basis of the enable signal 100 generated by the enable logic combination 36, as described above, in the logic circuit of the design target of this modification. Thus, the CG circuit 35 controls the supply of the clock signal (CLK) to the F/F 32.

The enable logic combination 36 contains enable logic circuits 37A and 37B and an AND gate 38. The enable logic circuits 37A and 37B respectively constitute enable logics A and B. The enable logic circuits 37A and 37B receive an output from a same flip-flop (F/F) 39. The output of each of the enable logic circuits 37A and 37B is input to the same AND gate 38. The other components are similar to those in the case of the embodiments illustrated in FIG. 3, and therefore, descriptions thereof are not repeated.

Next, the design result of this modification is described. As illustrated in FIG. 6, the enable logic combination 36 is separated into an enable logic "A" at which the delay time is smaller and an enable logic "B" at which the delay time is larger, that is, an enable logic circuit 37A and an enable logic circuit 37B, as described above. Moreover, a CG circuit 35 is set in the vicinity of the logic circuit block 31 at the trailing end, and a CG circuit 40 is also set in the upstream of the clock buffer 34.

The enable logic circuits 37A and 37B receive an output from the same flip-flop (F/F) 39. The output of each of the enable logic circuits 37A and 37B is input to the same AND gate 38. The other components are similar to those in the case of the embodiments illustrated in FIG. 4, and therefore, descriptions thereof are not repeated.

The above embodiment and the modification describe a case of having one logic circuit block 31 in the lowest order hierarchy at the trailing end in the logic circuit of the design target. However, of course, the above embodiment and the modification are applicable to a case of having multiple logic circuit blocks 31 in the logic circuit of the design target.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A device for automatic configuration of a semiconductor integrated circuit, the device comprising:
   a memory that stores circuit data representing a structure of a logic circuit including a first clock gating circuit; and
   a processor configured to:
      retrieve the circuit data from the memory;
      determine first and second logical elements from each of which an enable signal is output to the first clock gating circuit;
      calculate a delay time of each of the first and second logical elements;
      separate the first and second logical elements on the basis of the calculated delay time; and
      add a second clock gating circuit for the first logical element after separating the first and second logical elements.

2. The device according to claim 1, wherein
   the processor is configured to determine the first and second logical elements each outputting the enable signal to an AND gate, which outputs an output signal to the first clock gating circuit.

3. The device according to claim 1, wherein
   the processor is configured to determine the first and the second logical elements both receiving a same input signal from a third logical element and each outputting the enable signal to an AND gate, which outputs an output signal to the first clock gating circuit.

4. The device according to claim 3, wherein the third logical element is a flip flop circuit.

5. The device according to claim 1,
   wherein the processor is configured to determine the first and the second logical element each receiving an input signal from a third logical element and outputting the enable signal to an AND gate, which outputs an output signal to the first clock gating circuit.

6. The device according to claim 1, wherein
   a clock circuit is positioned at the most upstream of the logic circuit, and
   the processor is configured to add the second clock gating circuit at an upstream side of the first clock gating circuit so as to receive the enable signal from one of the first and the second logical element the delay time of which is smaller.

7. The device according to claim 1, wherein
   the logic circuit includes a clock circuit that outputs a clock signal to the first clock gating circuit via a clock buffer, and
   the processor is configured to add the second clock gating circuit at an upstream side of the clock buffer so as to receive the enable signal from one of the first and the second logical element the delay time of which is smaller.

8. The device according to claim 7, wherein
   the processor is configured to arrange the first clock gating circuit at a downstream side of the clock buffer so as to receive one of the first and the second logical element the delay time of which is greater.

9. The device according to claim 1, wherein
   the logic circuit includes a clock circuit that outputs a clock signal to the first clock gating circuit via a first and a second clock buffer, and
   the processor is configured to add the second clock gating circuit between the first and the second clock buffer so as to receive the clock signal from the first clock buffer and receive the enable signal from one of the first and the second logical element the delay time of which is smaller.

10. The device according to claim 9, wherein
    the processor is configured to arrange the first clock gating circuit at a downstream side of the second clock buffer so as to receive the clock signal from the second clock buffer and receive the enable signal from one of the first and the second logical element the delay time of which is greater.

11. A method carried out by a device for automatic configuration of a semiconductor integrated circuit, the method comprising:
    retrieving, from a memory, circuit data representing a structure of a logic circuit including a first clock gating circuit;
    determining first and second logical elements from each of which an enable signal is output to the first clock gating circuit;
    calculating a delay time of each of the first and second logical elements;
    separating the first and second logical elements on the basis of the calculated delay time; and
    adding a second clock gating circuit for the first logical element after separating the first and second logical elements.

12. The method according to claim 11, wherein
    said determining comprises determining the first and second logical elements each outputting the enable signal to an AND gate, which outputs an output signal to the first clock gating circuit.

13. The method according to claim 11, wherein
    said determining comprises determining the first and the second logical elements both receiving a same input signal from a third logical element and each outputting the enable signal to an AND gate, which outputs an output signal to the first clock gating circuit.

14. The method according to claim 13, wherein the third logical element is a flip flop circuit.

15. The method according to claim 11,
said determining comprises determining the first and the second logical element each receiving an input signal from a third logical element and outputting the enable signal to an AND gate, which outputs an output signal to the first clock gating circuit.

16. The method according to claim 11, wherein
a clock circuit is positioned at the most upstream of the logic circuit, and
said adding comprises adding the second clock gating circuit at an upstream side of the first clock gating circuit so as to receive the enable signal from one of the first or the second logical element the delay time of which is smaller.

17. The method according to claim 11, wherein
the logic circuit includes a clock circuit that outputs a clock signal to the first clock gating circuit via a clock buffer, and
said adding comprises adding the second clock gating circuit at an upstream side of the clock buffer so as to receive the enable signal from one of the first and the second logical element the delay time of which is smaller.

18. The method according to claim 17, wherein
said adding comprises arranging the first clock gating circuit at a downstream side of the clock buffer so as to receive one of the first and the second logical element the delay time of which is greater.

19. The method according to claim 11, wherein
the logic circuit includes a clock circuit that outputs a clock signal to the first clock gating circuit via a first and a second clock buffer, and
said adding comprises adding the second clock gating circuit between the first and the second clock buffer so as to receive the clock signal from the first second clock buffer and receive the enable signal from one of the first and the second logical element the delay time of which is smaller.

20. The method according to claim 19, wherein
said adding comprises arranging the first clock gating circuit at a downstream side of the second clock buffer so as to receive the clock signal from the second clock buffer and receive the enable signal from one of the first and the second logical element the delay time of which is greater.

* * * * *